(12) United States Patent
McGregor

(10) Patent No.: US 6,921,903 B2
(45) Date of Patent: Jul. 26, 2005

(54) METHOD AND SYSTEM FOR MEASURING NEUTRON EMISSIONS AND IONIZING RADIATION, SOLID STATE DETECTOR FOR USE THEREIN, AND IMAGING SYSTEM AND ARRAY OF SUCH DETECTORS FOR USE THEREIN

(75) Inventor: Douglas S. McGregor, Riley, KS (US)

(73) Assignee: The Regents of the University of Michigan, Ann Arbor, MI (US)

( * ) Notice: Subject to any disclaimer, the term of this patent is extended or adjusted under 35 U.S.C. 154(b) by 244 days.

(21) Appl. No.: 10/288,071

(22) Filed: Nov. 5, 2002

(65) Prior Publication Data

US 2004/0084626 A1 May 6, 2004

(51) Int. Cl.[7] ................................................. G01T 3/08
(52) U.S. Cl. ................................................. 250/370.05
(58) Field of Search ....................... 250/370.05, 390.01, 250/370.13

(56) References Cited

U.S. PATENT DOCUMENTS

| | | | |
|---|---|---|---|
| 4,757,202 A | | 7/1988 | East |
| 4,851,687 A | | 7/1989 | Ettinger et al. |
| 4,926,052 A | * | 5/1990 | Hatayama et al. ..... 250/370.14 |
| 5,070,027 A | * | 12/1991 | Mito et al. ................... 438/483 |
| 5,083,028 A | | 1/1992 | Decossas et al. |
| 5,659,177 A | | 8/1997 | Schulte et al. |
| 5,726,453 A | | 3/1998 | Lott et al. |
| 5,940,460 A | | 8/1999 | Seidel et al. |
| 5,969,359 A | | 10/1999 | Ruddy et al. |
| 6,175,120 B1 | | 1/2001 | McGregor et al. |
| 6,252,923 B1 | | 6/2001 | Iacovino et al. |

* cited by examiner

*Primary Examiner*—David Porta
*Assistant Examiner*—Marcus Taningco
(74) *Attorney, Agent, or Firm*—Brooks Kushman P.C.

(57) ABSTRACT

A method and system for measuring neutron emissions and ionizing radiation, such as gamma emissions, solid state detector for use therein, and imaging system and array of such detectors for use therein are provided using Cd- and/or Hg-containing semiconductors or B-based, Li-based or Gd-based semiconductors. The resulting systems and detectors used therein may be not only compact and portable, but also capable of operating at room temperature. The detectors may also be operable as gamma ray spectrometers.

80 Claims, 1 Drawing Sheet

US 6,921,903 B2

METHOD AND SYSTEM FOR MEASURING NEUTRON EMISSIONS AND IONIZING RADIATION, SOLID STATE DETECTOR FOR USE THEREIN, AND IMAGING SYSTEM AND ARRAY OF SUCH DETECTORS FOR USE THEREIN

BACKGROUND OF THE INVENTION

1. Field of the Invention

This invention relates to methods and systems for measuring neutron emissions and ionizing radiation, solid state detectors for use therein, and imaging systems and arrays of such detectors for use therein.

2. Background Art

The material requirements for a room temperature-operated, high resolution semiconductor gamma ray spectrometer include large free charge carrier mobilities ($\mu$), or alternatively, high achievable free charge carrier velocities (v), long mean free drift times ($\tau^*$), a relatively large energy band gap ($E_g$), generally between 1.4 eV to 2.5 eV, high representative values of atomic number (Z), and availability in large volumes. Presently, no semiconductor has all of the listed ideal material properties desired for the "perfect" room temperature-operated, semiconductor radiation spectrometer, although many have a considerable fraction, of the required properties. Some wide band gap compound semiconductors that offer promise as room temperature-operated, gamma ray spectrometers include $HgI_2$, CdTe, and CdZnTe.

In addition to unique properties required for a room temperature-operated, gamma ray detector, $HgI_2$, CdTe, and CdZnTe can also serve as neutron detectors. The isotope $^{113}$Cd, occurring in nature at a natural abundance of 12.3%, spontaneously emits gamma rays when it absorbs neutrons. Additionally, pure $^{113}$Cd has a thermal neutron cross-section of 20,000 barns, an enormously large value. Hence, CdTe and CdZnTe semiconductors can both absorb neutrons and then spontaneously emit the gamma ray reaction products. Natural Cd, due to the dilution with other Cd isotopes, has a cross-section of only 2450 barns. Further, CdTe and CdZnTe have reduced macroscopic (or linear) thermal neutron cross-section, after considering further dilution with Zn and Te atoms, of only 29.72/cm. Still, 29.72/cm is a reasonably large number, in that over 99% of impinging thermal neutrons will be absorbed within a thickness of 3 mm.

Similarly, $^{199}$Hg also absorbs neutrons and emits spontaneous gamma rays, and $^{199}$Hg occurs in nature at 16.9% natural abundance. Pure $^{199}$Hg has a thermal neutron microscopic cross-section of 2000 barns, and the semiconductor $^{199}$Hg has a macroscopic thermal neutron cross-section of 2.87/cm. A 3 mm thick $HgI_2$ detector will absorb 57.7% of the thermal neutrons impinging upon it.

It has been shown that CdTe, CdZnTe, and $HgI_2$ can be used to detect neutrons. In general, the $^{113}$Cd(n,$\gamma$)$^{114}$Cd reaction has salient gamma ray emissions at 558.6 keV and 651.3 keV. It is these emissions that the CdTe or CdZnTe gamma ray spectrometers are to detect, and being gamma ray detectors, the system has been shown to work. The $^{199}$Hg(n,$\gamma$)$^{200}$Hg reaction releases a single salient gamma ray emission at 368 keV which is easier to detect that the $^{113}$Cd(n,$\gamma$)$^{114}$Cd emissions because of its lower energy. Again, the concept has been proven to work.

Unfortunately, a gamma ray field accompanies most neutron measurements. Since the described devices are gamma ray detectors, confusion can arise regarding the difference between neutron-induced gamma rays and background gamma rays. Even if the energy resolution of the detectors is superb, the Compton scattering continuum remains a major portion of the established counts in the detection spectrum, and feature that will blend all Compton scattering gamma ray counts in the spectrum. Hence, a method is needed to confidently discriminate between neutron-induced gamma ray counts and background gamma ray counts.

A method is described in the literature that allows for gamma ray discrimination, yet it has problems. In the literature, Beyerle and Hull describe using $HgI_2$ with the common natural abundance of $^{199}$Hg. They first shield gamma rays with at least 2.5 inches of lead between a neutron source and the detector. The measurement was taken. Afterward, a second spectrum was taken with an additional 0.0625 inch thick sheet of Cd placed between the neutron source and the detector. The Cd sheet effectively removes the neutrons. The second spectrum was then subtracted from the first to reveal the neutron-induced spectrum. The method demonstrated that $HgI_2$ with natural Hg could be used for a detector, however the accuracy of the measurement is questionable. Firstly, it has been demonstrated that lead removes neutrons through scattering and absorption when placed between the neutron source and the detector. Hence, using lead as a shield reduces the device sensitivity to neutrons. Secondly, natural Cd (which has $^{113}$Cd in it) generates gamma rays, which become part of the background. Hence, placing Cd in the beam increases the gamma ray background higher than measured without the Cd. As a result, the actual gamma ray background is different for both devices and the subtracted spectrum produces an erroneous lower number of a neutron count. Then, Cd sheet can be placed far away from the device (2.5 meters in the literature) to reduce the gamma ray background generated by the $^{113}$Cd(n,$\gamma$)$^{114}$Cd reaction, yet the arrangement does not allow for the realization of a compact detecting instrument.

U.S. Pat. No. 6,175,120 to McGregor et al. discloses a high-resolution, solid state, ionization detector and an array of such detectors.

The following U.S. Pat. Nos. are also relevant: 6,252,923; 5,969,359; 5,940,460; 5,726,453; 5,659,177; 5,083,028; 4,851,687; and 4,757,202.

SUMMARY OF THE INVENTION

An object of the present invention is to provide a method and system for measuring neutron emissions and ionizing radiation, solid state detector for use therein, and imaging system and array of such detector for use therein, wherein a shield is positioned to shield neutron-induced, ionizing radiation from one semiconductor active region to another semiconductor active region.

In carrying out the above object and other objects of the present invention, a method is provided for measuring neutron emissions and ionizing radiation. The method includes positioning at least one solid state detector to receive the neutron emissions and ionizing radiation. The at least one solid state detector includes a first semiconductor active region for generating neutron-induced ionizing radiation in response to the neutron emissions and for generating a first electronic signal in response to the neutron emissions and ionizing radiation. The at least one solid state detector also includes a second semiconductor active region, substantially unresponsive to the neutron emissions, for generating a second electronic signal in response to the ionizing radiation and a shield positioned to shield the neutron-induced ionizing radiation from the second semiconductor active region so that the second electronic signal is not generated in response to the neutron-induced ionizing radiation. The method further includes processing the first and second signals to distinguish between the neutron emissions and ionizing radiation measured by the at least one solid state detector.

Further in carrying out the above object and other objects of the present invention, a system is provided for measuring neutron emissions and ionizing radiation. The system includes at least one solid state detector which, in turn, includes a first semiconductor active region for generating neutron-induced ionizing radiation in response to the neutron emissions and for generating a first electronic signal in response to the neutron emissions and ionizing radiation. The at least one solid state conductor also includes a second semiconductor active region, substantially unresponsive to the neutron emissions, for generating a second electronic signal in response to the ionizing radiation and a shield positioned to shield the neutron-induced ionizing radiation from the second semiconductor active region so that the second electronic signal is not generated in response to the neutron-induced ionizing radiation. The system also includes a signal processor for processing the first and second signals to distinguish between the neutron emissions and ionizing radiation measured by the at least one solid state detector.

Still further in carrying out the above object and other objects of the present invention, a solid state detector for measuring neutron emissions and ionizing radiation is provided The detector includes a first semiconductor active region for generating neutron-induced ionizing radiation in response to the neutron emissions and for generating a first electronic signal in response to the neutron emissions and ionizing radiation. The detector further includes a second semiconductor active region being substantially unresponsive to the neutron emissions for generating a second electronic signal in response to the ionizing radiation and a shield positioned to shield the neutron-induced ionizing radiation from the second semiconductor active region so that the second electronic signal is not generated in response to the neutron-induced ionizing radiation.

Yet still further in carrying out the above object and other objects of the present invention, an array of such detectors is provided.

In further carrying out the above object and other objects of the present invention, an imaging system for imaging neutron emissions and ionizing radiation is provided. The system includes an array of solid state detectors. Each of the detectors includes a first semiconductor active region for generating neutron-induced ionizing radiation in response to the neutron emissions and for generating a first electronic signal in response to the neutron emissions and ionizing radiation. Each of the detectors also includes a second semiconductor active region being substantially unresponsive to the neutron emissions for generating a second electronic signal in response to the ionizing radiation and a shield positioned to shield the neutron-induced ionizing radiation from the second semiconductor active region so that the second electronic signal is not generated in response to the neutron-induced ionizing radiation. The system further includes an array of sheets of high-density material for separating adjacent solid state detectors.

The first and second semiconductor active regions may have substantially the same size and shape.

The first and second semiconductor active regions may have substantially the same sensitivity to ionizing radiation.

Each of the detectors is preferably a room temperature solid state detector.

Each of the semiconductor active regions preferably comprises at least one material selected from the group consisting of CdTe, CdZnTe, CdS and $HgI_2$.

Each of the semiconductor active regions may comprise a material including isotopes of Cd-113 and wherein concentration of Cd-113 in the first semiconductor active region is sufficient to absorb neurons and spontaneously emit gamma rays and concentration of Cd-113 in the second semiconductor active region is substantially insensitive to the neutron emissions.

Each of the semiconductor active regions may comprise at least one material including isotopes of Hg-199 and wherein concentration of Hg-199 in the first semiconductor active region is sufficient to absorb neutrons and spontaneously emit gamma rays and concentration of Hg-199 in the second semiconductor active region is substantially insensitive to the neutron emissions.

Each of the semiconductor active regions may comprise a gamma ray spectrometer.

Each of the semiconductor active regions may preferably include either Cd or Hg.

The ionizing radiation may include gamma emissions and/or charged particles.

Each of the semiconductor active regions may be B-based, Li-based or Gd-based.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

The present invention includes a radiation detector for neutron detection and discrimination. The detector is capable of measuring both neutrons and ionizing radiation such as gamma rays. The detector may be a portable, room temperature-operated, gamma ray spectrometer and neutron counter. Such a detector is capable of discriminating between background gamma ray events and neutron-induced events.

The detector preferably uses Cd- and/or Hg-containing semiconductor devices. The detector may use:

1. Natural concentrations of $^{113}$Cd or $^{199}$Hg;

2. Depleted and enriched concentrations of $^{113}$Cd or $^{199}$Hg;

3. Electronics capable of subtracting detector signals of one semiconductor device from another; and 4. A gamma ray shield between the devices.

The starting materials needed to grow $HgI_2$, CdTe and CdZnTe can be depleted or enriched to either reduce or enhance neutron absorption. For instance, enriching the $^{199}Hg$ in $HgI_2$ from 16.9% up to 90% will allow for 98.9% thermal neutron absorption within a 3 mm thick piece. Depleting the $^{199}Hg$ in $HgI_2$ from 16.9% down to 5% will reduce the thermal neutron absorption in a 3 mm thick detector to only 22.4%. Further depleting it to only 1% reduces the absorption in a 3 mm thick detector to only 4.95%. One can then take a 90% $^{199}Hg$ enriched $HgI_2$ device to detect both neutrons and gamma rays and a 1% $^{199}Hg$ depleted $HgI_2$ device to detect mainly the gamma rays. Subtracting the spectrum of the depleted device from the spectrum of the enriched device yields the neutron-induced spectrum. In a similar fashion, CdTe, and CdZnTe detecting systems can be manufactured. However, the large thermal neutron cross-section for $^{113}Cd$ forces the depletion to be below 0.1% to be effective.

Figure 1:
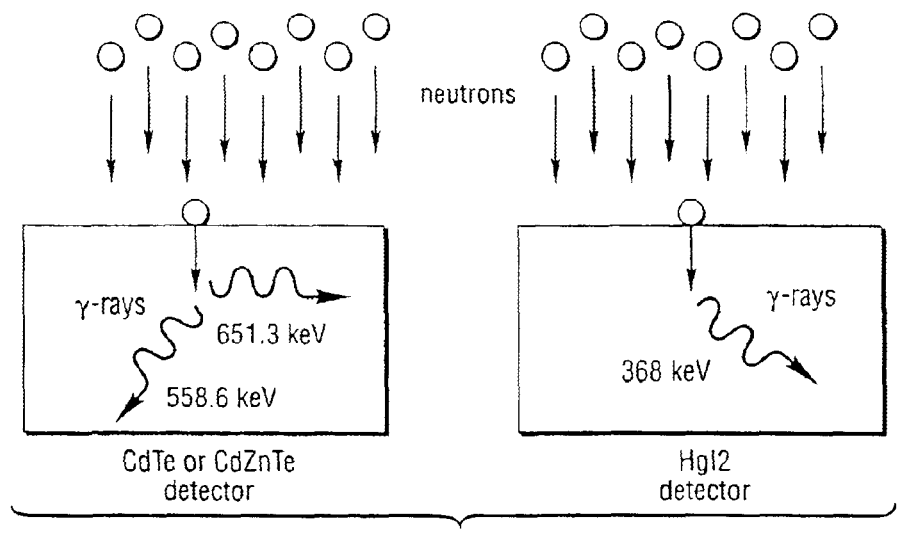
FIG. 1 is a schematic view showing a CdTe or CdZnTe detector and an $HgI_2$ detector in an environment containing neutrons.

FIG. 1 shows the general concept of the detecting mechanisms for CdTe, CdZnTe, and $HgI_2$ neutron detector devices. The neutrons are absorbed in the detector devices, which then immediately release gamma rays. A large percentage of the release gamma rays are then detected in the very same detector device.

In particular, neutrons are absorbed in the isotopes of Cd-113 or Hg-199, which elevates them to excited states of Cd-114 and Hg-200, respectively. The Cd-114 spontaneously emits many gamma rays, primarily at energies of 558.6 keV and 651.3 keV. Similarly, Hg-200 emits many gamma rays, primarily at 368 KeV. The materials CdTe, CdZnTe, and Hg12 are all well known gamma ray spectrometers, hence by simply detecting and identifying the energy of 558.6 keV in CdTe or CdZnTe detector devices or 368 keV in $HgI_2$ detector devices indicates a neutron interaction.

Figure 2:
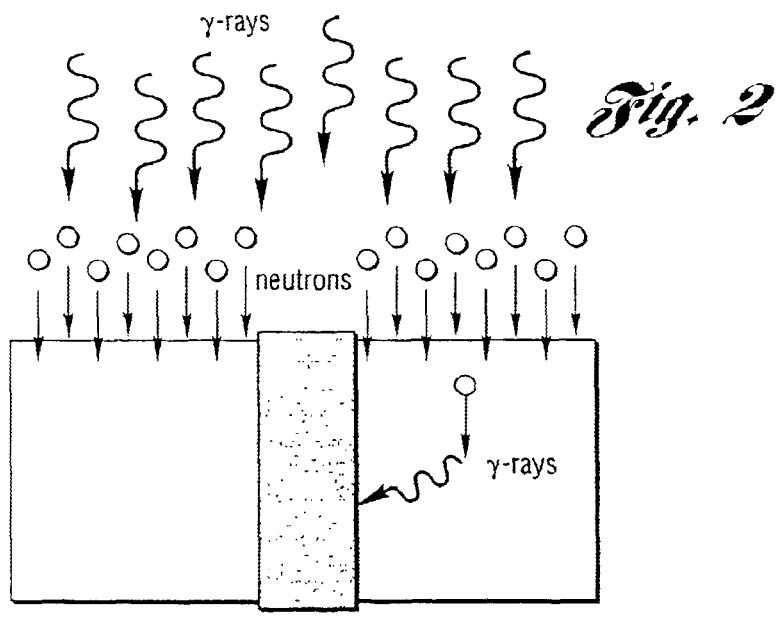
FIG. 2 is a schematic view of a detector of the present invention in an environment containing both gamma rays and neutrons.

As shown in FIG. 2, dual detector devices can be hooked together such that one device has neutron reactive material and the other does not.

One detector device with natural or higher concentration of Cd-113 or Hg-199 is coupled by a heavy metal shield (such as W or Pb) to a detector device with depleted concentration of Cd-113 or Hg-199. The coupled detector devices are operated in an environment where both neutrons and gamma rays are present. The signal from the detector device depleted of neutron reactive material is subtracted from the signal of the detector device with neutron reactive material, such as by a signal processor. The net signal yields the neutron interaction contribution.

In this way, the neutron-induced spectra can be easily discriminated from the background gamma ray spectra. In other words, a device that has neutron reactive material ($^{113}Cd$ for CdTe and CdZnTe devices, and $^{199}Hg$ for $HgI_2$ devices) is placed on one side of a small tungsten or lead block (or any other effective gamma ray shield). The block does not need to be large and only needs to be thick enough to eliminate approximately 99% of the gamma emissions produced by neutron interactions in the detector device. On the other side of the tungsten block is an identically-shaped and sized detector device that is manufactured from material depleted of neutron reactive material (again $^{113}Cd$ for CdTe and CdZnTe devices, and $^{199}Hg$ for $HgI_2$ devices). The device depleted of neutron reactive material is just as sensitive to gamma rays as the first device, but is not sensitive to neutrons. The system is run such that both detector devices operate together.

The system yields both the neutron field and the gamma ray field. The depleted device yields the gamma ray field, and since CdTe, CdZnTe, and $HgI_2$ devices can be operated as spectrometers, the system can identify the gamma rays and their source materials. The difference between the spectra of the neutron sensitive device and the depleted device yields the neutron field. Detection efficiency for gamma rays and neutrons is arrived at through typical calibration methods.

The system can be improved by using CdTe, CdZnTe, and $HgI_2$ detector devices enriched with either ($^{113}Cd$ or $^{199}Hg$) to improve neutron detection. Additionally, the neutron detector may operate best in some circumstances in which the $^{113}Cd$ or $^{199}Hg$ has actually been decreased. For instance, since 99% of neutrons are detected within 3 mm of CdTe or CdZnTe with natural Cd, then all of the gamma rays are generated within a 3 m thick region. These gamma rays have a higher change of escaping the device than gamma rays generated in the center of a 1 cm thick detector. Hence, by slightly reducing the $^{113}Cd$ concentration, the thickness over which neutrons are absorbed can be increased to 1 cm or more. With gamma rays being emitted over a larger region, more of the gamma rays generated from neutron reactions can be absorbed in the detector device.

Figure 3:
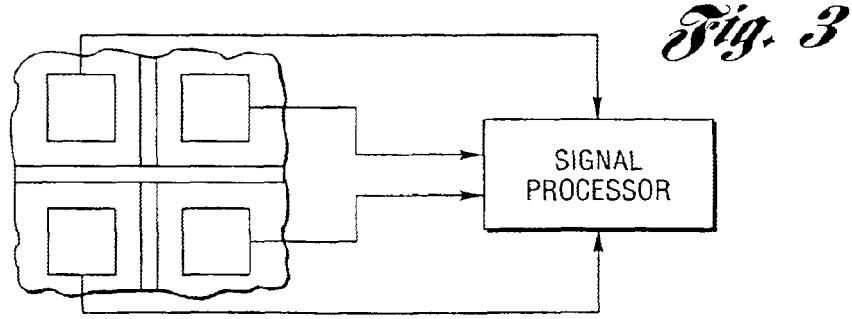
FIG. 3 is a schematic view, partially broken away, of a matrix or array of such detectors coupled to a signal processor and separated by an array of sheets to form an imaging system.

Additionally, a matrix or array of small individual detectors can be used to produce a neutron-imaging system of FIG. 3. Each small detector is separated from its neighbor by a thin sheet of high-density material, such as tungsten. Such an array would probably not be able to take advantage of the dual detector discrimination feature, but could allow for simultaneous neutron and gamma ray imaging.

While the above description particularly address CdTe, CdZnTe and $HgI_2$ semiconductor crystals, there are other candidates for the device. For instance, CdS is a semiconductor that could be used to make the disclosed device. However, CdTe, CdZnTe and $HgI_2$ are the main example semiconductors since they are presently the best way to demonstrate and reduce the invention to practice.

Also, there are other materials under investigation that release ionizing radiation upon the absorption of neutrons. For example, $^{10}B$, $^{6}Li$, $^{155}Gd$ and $^{157}Gd$. Similar to Cd and Hg, other isotopes of B, Li, and Gd do not interact with neutrons quite as strongly.

Boron has two isotopes of natural abundance: $^{10}B$ at 19.9% and $^{10}B$ at 80.1%. $^{10}B$ has a thermal neutron (0.025 eV) absorption cross-section of 3480 barns, whereas $^{10}B$ has a negligible thermal neutron absorption cross-section. The $^{10}B(n,\alpha)$ $^{7}Li$ reaction leads to the following reaction products:

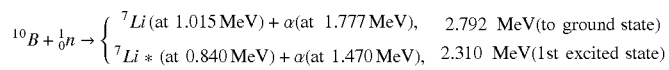

$$^{10}B + ^{1}_{0}n \rightarrow \begin{cases} ^{7}Li\,(\text{at }1.015\,\text{MeV}) + \alpha(\text{at }1.777\,\text{MeV}), & 2.792 \text{ MeV(to ground state)} \\ ^{7}Li*\,(\text{at }0.840\,\text{MeV}) + \alpha(\text{at }1.470\,\text{MeV}), & 2.310 \text{ MeV(1st excited state)} \end{cases}$$

Reacting Q – Value which are released in opposite directions when thermal neutrons (0.0259 eV) are absorbed by $^{10}$B. After absorption, 94% of the reactions leave the $^7$Li ion in its first excited state, which rapidly de-excites to the ground state ($\sim 10^{-13}$ seconds) by releasing a 480 keV gamma ray. The remaining 6% of the reactions result in the $^7$Li ion dropping directly to its ground state.

Lithium has two isotopes of natural abundance: $^6$Li at 7.5% and $^7$Li at 92.5%. The microscopic thermal neutron (0.0259 eV) absorption cross-section of $^6$Li is 940 barns, whereas the microscopic thermal neutron cross-section for $^7$Li is negligible. The $^6$Li(n,α)$^3$H reaction leads to the following products:

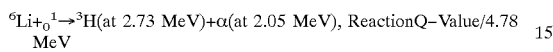

$^6\text{Li} + {}_0^1 \rightarrow {}^3\text{H(at 2.73 MeV)} + \alpha(\text{at 2.05 MeV}), \text{ReactionQ-Value/4.78 MeV}$ which are oppositely directed if the neutron energy is sufficiently small.

Gd-coated devices are attractive for one main reason, that being the large thermal neutron absorption cross-sections of $^{155}$Gd and $^{157}$Gd (58,000 and 240,000 barns, respectively). Other Gd isotopes have small neutron interaction cross-sections. Purified $^{157}$Gd is expensive and presently not a practical coating for semiconductor detectors, however natural Gd is not cost prohibitive and still has a respectably large thermal neutron cross-section of 46,000 barns. Gd emits various conversion electrons and gamma rays at energies ranging up to 220 keV which can be detected and used as the conversion reaction to indicate a neutron interaction has occurred.

Similar to the gamma ray emissions from $^{113}$Cd(n,γ) reactions and $^{199}$Hg(n,γ) reactions, the charged particle emissions from $^{10}$B, $^6$Li, $^{155}$Gd, and $^{157}$Gd can be used as the detecting reactions for neutron interactions within the materials.

Examples of B-based semiconductors include, but are not limited to:
Boron Phosphide (BP);
Boron Nitride (BN);
Boron Arsenide (BAs);
Beta-Barium Borate (β-BaB$_2$O$_4$ or BBO);
Lithium Triborate (LiB$_3$O$_5$ or LBO); and
Boron Carbide (B$_4$C).

Examples of Li-based semiconductors include, but are not limited to:
Lithium Triborate (LiB$_3$O$_5$ or LBO); and
Lithium Fluoride (LiF).

The orientation of B-based, Li-based, and Gd-based compounds need not be side-by-side as shown in the drawing Figures, but also may be in a layered structure. The reason stems from the nature of the radiation emissions. Charged particle emissions from B, Li, and Gd do not have the same penetrating range as do the gamma rays emitted from Cd and Hg, hence the shielding requirement (between the devices) can be relaxed. As a result, a thin charged particle shield can be provided between detectors.

Either detector can be the device that is enriched with B-10, Li-6, Gd-157, or Gd-155. The other detector may be depleted of B-10, Li-6, Gd-157, or Gd-155 or may be simply the natural abundance of B-10, Li-6, Gd-157, or Gd-155.

An array or stack of detectors can also be configured from the semiconductor materials, in which alternating devices separated by thin charged particle shields can be either of increased neutron detection sensitivity or decreased neutron detection sensitivity.

While the best mode for carrying out the invention has been described in detail, those familiar with the art to which this invention relates will recognize various alternative designs and embodiments for practicing the invention as defined by the following claims.

What is claimed is:

1. A method for measuring neutron emissions and ionizing radiation, the method comprising:
    positioning at least one solid state detector to receive the neutron emissions and ionizing radiation, the at least one solid state detector including:
        a first semiconductor active region comprising at least one material having a first concentration sufficient for generating neutron-induced ionizing radiation in response to neutron absorptions and for generating a first electronic signal in response to the neutron absorptions and corresponding ionizing radiation;
        a second semiconductor active region comprising the at least one material having a second concentration lower than the first concentration so as to be substantially less responsive to the neutron emissions for generating a second electronic signal in response to neutron-induced radiation emissions; and
        a shield positioned to shield the neutron-induced ionizing radiation emitted from the first semiconductor active region so that the second semiconductor active region in unaffected by the ionizing radiation from the first semiconductor active region, and the second electronic signal from the second semiconductor active region is not generated in response to the neutron-induced ionizing radiation from the first semiconductor active region; and
    processing the first and second signals to distinguish between the neutron emissions and the ionizing radiation measured by the at least one solid state detector.

2. The method as claimed in claim 1, wherein the first and second semiconductor active regions have substantially the same size and shape.

3. The method as claimed in claim 1, wherein the first and second semiconductor active regions have substantially similar sensitivity to background and surrounding ionizing radiation which primarily includes gamma rays, x-rays, and charged particles, and to radiations released by neutron interactions within the first and second semiconductor active regions.

4. The method as claimed in claim 1, wherein the at least one detector is a room temperature solid state detector.

5. The method as claimed in claim 1, wherein the at least one material is selected from the group consisting of CdTe, CdZnTe, CdS and HgI$_2$.

6. The method as claimed in claim 1, wherein the at least one material includes isotopes of Cd-113 and wherein concentration of Cd-113 in the first semiconductor active region is sufficient to absorb neutrons and spontaneously emit gamma rays and concentration of Cd-113 in the second semiconductor active region is reduced such that it is less sensitive to neutron absorptions and corresponding ionizing radiation than the first semiconductor active region.

7. The method as claimed in claim 1, wherein the at least one material includes isotopes of Hg-199 and wherein concentration of Hg-199 in the first semiconductor active region is sufficient to absorb neutrons and spontaneously emit gamma rays and concentration of Hg-199 in the second semiconductor active region is reduced such that it is less sensitive to neutron absorptions and corresponding ionizing radiation than the first semiconductor active region.

8. The method as claimed in claim 1, wherein the at least one material includes isotopes of B-10 and wherein concentration of B-10 in the first semiconductor active region is sufficient to absorb neutrons and spontaneously emit charged particle and gamma radiation emissions and concentration of B-10 in the second semiconductor active region is reduced such that it is less sensitive to neutron absorptions and corresponding ionizing radiation than the first semiconductor active region.

9. The method as claimed in claim 1, wherein the at least one material includes isotopes of Li-6 and wherein concentration of Li-6 in the first semiconductor active region is sufficient to absorb neutrons and spontaneously emit charged particle radiation emissions and concentration of Li-6 in the second semiconductor active region is reduced such that it is less sensitive to neutron absorptions and corresponding ionizing radiation than the first semiconductor active region.

10. The method as claimed in claim 1, wherein the at least one material includes isotopes of Gd-157 or Gd-155 and wherein concentration of Gd-157 or Gd-155 in the first semiconductor active region is sufficient to absorb neutrons and spontaneously emit charged particle and gamma radiation emissions and concentration of Gd-157 or Gd-155 in the second semiconductor active region is reduced such that it is less sensitive to neutron absorptions and corresponding ionizing radiation than the first semiconductor active region.

11. The method as claimed in claim 1, wherein each of the semiconductor active regions comprises a detector capable of detecting charged particles.

12. The method as claimed in claim 1, wherein the neutron-induced ionizing radiation includes gamma ray emissions.

13. The method as claimed in claim 1, wherein the neutron-induced ionizing radiation includes charged particles.

14. The method as claimed in claim 1, wherein each of the semiconductor active regions comprises a gamma ray spectrometer.

15. The method as claimed in claim 1, wherein the at least one material includes either Cd or Hg.

16. The method as claimed in claim 1, wherein the at least one material is B-based, Li-based or Gd-based.

17. A system for measuring neutron emissions and ionizing radiation, the system comprising:
at least one solid state detector including:
a first semiconductor active region comprising at least one material having a first concentration sufficient for generating neutron-induced ionizing radiation in response to neutron absorptions and for generating a first electronic signal in response to the neutron absorptions and corresponding ionizing radiation;
a second semiconductor active region comprising the at least one material having a second concentration lower than the first concentration so as to be substantially less responsive to the neutron emissions for generating a second electronic signal in response to neutron-induced radiation emissions; and
a shield positioned to shield the neutron-induced ionizing radiation emitted from the first semiconductor active region so that the second semiconductor active region in unaffected by the ionizing radiation from the fist semiconductor active region, and the second electronic signal from the second semiconductor active region is not generated in response to the neutron-induced ionizing radiation from the first semiconductor active region; and
a signal processor for processing the first and second signals to distinguish between the neutron emissions and corresponding ionizing radiation measured by the at least one solid state detector.

18. The system as claimed in claim 17, wherein the first and second semiconductor active regions have substantially the same size and shape.

19. The system as claimed in claim 17, wherein the first and second semiconductor active regions have substantially similar sensitivity to background and surrounding ionizing radiation which primarily includes gamma rays, x-rays, and charged particles, and to radiations released by neutron interactions within the first and second semiconductor active regions.

20. The system as claimed in claim 17, wherein the at least one detector is a room temperature solid state detector.

21. The system as claimed in claim 17, wherein the at least one material is selected from the group consisting of CdTe, CdZnTe, CdS and $HgI_2$.

22. The system as claimed in claim 17, wherein each of the semiconductor active regions comprises a gamma ray spectrometer.

23. The system as claimed in claim 17, wherein the at least one material includes either Cd or Hg.

24. The system as claimed in claim 17, wherein the at least one material includes isotopes of Cd-113 and wherein concentration of Cd-113 in the first semiconductor active region is sufficient to absorb neutrons and spontaneously emit gamma rays and concentration of Cd-113 in the second semiconductor active region is reduced such that it is less sensitive to neutron absorptions and corresponding ionizing radiation than the first semiconductor active region.

25. The system as claimed in claim 17, wherein the at least one material includes isotopes of Hg-199 and wherein concentration of Hg-199 in the first semiconductor active region is sufficient to absorb neutrons and spontaneously emit gamma rays and concentration of Hg-199 in the second semiconductor active region is reduced such that it is less sensitive to neutron absorptions and corresponding ionizing radiation than the first semiconductor active region.

26. The system as claimed in claim 17, wherein the at least one material includes isotopes of B-10 and wherein concentration of B-10 in the first semiconductor active region is sufficient to absorb neutrons and spontaneously emit charged particle and gamma radiation emissions and concentration of B-10 in the second semiconductor active region is reduced such that it is less sensitive to neutron absorptions and corresponding ionizing radiation than the first semiconductor active region.

27. The system as claimed in claim 17, wherein the at least one material includes isotopes of Li-6 and wherein concentration of Li-6 in the first semiconductor active region is sufficient to absorb neutrons and spontaneously emit charged particle radiation emissions and concentration of Li-6 in the second semiconductor active region is reduced such that it is less sensitive to neutron absorptions and corresponding ionizing radiation than the first semiconductor active region.

28. The system as claimed in claim 17, wherein the at least one material includes isotopes of Gd-157 or Gd-155 and wherein concentration of Gd-157 or Gd-155 in the first semiconductor active region is sufficient to absorb neutrons and spontaneously emit charged particle and gamma radiation emissions and concentration of Gd-157 or Gd-155 in the second semiconductor active region is reduced such that it is less sensitive to the neutron absorptions and corresponding ionizing radiation than the first semiconductor active region.

29. The system as claimed in claim 17, wherein each of the semiconductor active regions comprises a detector capable of detecting charged particles.

30. The system as claimed in claim 17, wherein the neutron-induced ionizing radiation includes gamma ray emissions.

31. The system as claimed in claim 17, wherein the neutron-induced ionizing radiation includes charged particles.

32. The system as claimed in claim 17, wherein the at least one material is B-based, Li-based or Gd-based.

33. A solid state detector for measuring neutron emissions and ionizing radiation, the detector comprising:
- a first semiconductor active region comprising at least one material having a first concentration sufficient for generating neutron-induced ionizing radiation in response to neutron absorptions and for generating a first electronic signal in response to the neutron absorptions and corresponding ionizing radiation;
- a second semiconductor active region comprising the at least one material having a second concentration lower than the first concentration so as to be substantially less responsive to the neutron emissions for generating a second electronic signal in response to neutron-induced radiation emissions; and
- a shield positioned to shield the neutron-induced ionizing radiation emitted from the first semiconductor active region so that the second semiconductor active region in unaffected by the ionizing radiation from the fist semiconductor active region, and the second electronic signal from the second semiconductor active region is not generated in response to the neutron-induced ionizing radiation from the first semiconductor active region.

34. The detector as claimed in claim 33, wherein the first and second semiconductor active regions have substantially the same size and shape.

35. The detector as claimed in claim 33, wherein the first and second semiconductor active regions have substantially similar sensitivity to background and surrounding ionizing radiation which primarily includes gamma rays, x-rays, and charged particles, and to radiations released by neutron interactions within the first and second semiconductor active regions.

36. The detector as claimed in claim 33, wherein the detector is a room temperature solid state detector.

37. The detector as claimed in claim 33, wherein the at least one material is selected from the group consisting of CdTe, CdZnTe, CdS and $HgI_2$.

38. The detector as claimed in claim 33, wherein each of the semiconductor active regions comprises a gamma ray spectrometer.

39. The detector as claimed in claim 33, wherein the at least one material includes either Cd or Hg.

40. The detector as claimed in claim 33, wherein the at least one material includes isotopes of Cd-113 and wherein concentration of Cd-113 in the first semiconductor active region is sufficient to absorb neutrons and spontaneously emit gamma rays and concentration of Cd-113 in the second semiconductor active region is reduced such that it is less sensitive to neutron absorptions and corresponding ionizing radiation than the first semiconductor active region.

41. The detector as claimed in claim 33, wherein the at least one material includes isotopes of Hg-199 and wherein concentration of Hg-199 in the first semiconductor active region is sufficient to absorb neutrons and spontaneously emit gamma rays and concentration of Hg-199 in the second semiconductor active region is reduced such that it is less sensitive to neutron absorptions and corresponding ionizing radiation than the first semiconductor active region.

42. The detector as claimed in claim 33, wherein the at least one material includes isotopes of B-10 and wherein concentration of B-10 in the first semiconductor active region is sufficient to absorb neutrons and spontaneously emit charged particle and gamma radiation emissions and concentration of B-10 in the second semiconductor active region is reduced such that it is less sensitive to neutron absorptions and corresponding ionizing radiation than the first semiconductor active region.

43. The detector as claimed in claim 33, wherein the at least one material includes isotopes of Li-6 and wherein concentration of Li-6 in the first semiconductor active region is sufficient to absorb neutrons and spontaneously emit charged particle radiation emissions and concentration of Li-6 in the second semiconductor active region is reduced such that it is less sensitive to neutron absorptions and corresponding ionizing radiation than the first semiconductor active region.

44. The detector as claimed in claim 33, wherein the at least one material includes isotopes of Gd-157 or Gd-155 and wherein concentration of Gd-157 or Gd-155 in the first semiconductor active region is sufficient to absorb neutrons and spontaneously emit charged particle and gamma radiation emissions and concentration of Gd-157 or Gd-155 in the second semiconductor active region is reduced such that it is less sensitive to the neutron absorptions and corresponding ionizing radiation than the first semiconductor active region.

45. The detector as claimed in claim 33, wherein each of the semiconductor active regions comprises a detector capable of detecting charged particles.

46. The detector as claimed in claim 33, wherein the neutron-induced ionizing radiation includes gamma ray emissions.

47. The detector as claimed in claim 33, wherein the neutron-induced ionizing radiation includes charged particles.

48. The detector as claimed in claim 33, wherein the at least one material is B-based, Li-based or Gd-based.

49. An array of solid state detectors for measuring neutron emissions and ionizing radiation, each of the detectors comprising:
- a first semiconductor active region comprising at least one material having a first concentration sufficient for generating neutron-induced ionizing radiation in response to neutron absorptions and for generating a first electronic signal in response to the neutron absorptions and corresponding ionizing radiation;
- a second semiconductor active region comprising the at least one material having a second concentration lower than the first concentration so as to be substantially less responsive to the neutron emissions for generating a second electronic signal in response to neutron-induced radiation emissions; and
- a shield positioned to shield the neutron-induced ionizing radiation emitted from the first semiconductor active region so that the second semiconductor active region in unaffected by the ionizing radiation from the fist semiconductor active region, and the second electronic signal from the second semiconductor active region is not generated in response to the neutron-induced ionizing radiation from the first semiconductor active region.

50. The array as claimed in claim 49, wherein the first and second semiconductor active regions have substantially the same size and shape.

51. The array as claimed in claim 49, wherein the first and second semiconductor active regions have substantially similar sensitivity to background and surrounding ionizing radiation which primarily includes gamma rays, x-rays, and charged particles, and to radiations released by neutron interactions within the first and second semiconductor active regions.

52. The array as claimed in claim 49, wherein each of the detectors is a room temperature solid state detector.

53. The array as claimed in claim 49, wherein the at least one material is selected from the group consisting of CdTe, CdZnTe, CdS and $HgI_2$.

54. The array as claimed in claim 49, wherein each of the semiconductor active regions comprises a gamma ray spectrometer.

55. The array as claimed in claim 49, wherein the at least one material includes either Cd or Hg.

56. The array as claimed in claim 49, wherein the at least one material includes isotopes of Cd-113 and wherein concentration of Cd-113 in the first semiconductor active region is sufficient to absorb neutrons and spontaneously emit gamma rays and concentration of Cd-113 in the second semiconductor active region is reduced such that it is less sensitive to neutron absorptions and corresponding ionizing radiation than the first semiconductor active region.

57. The array as claimed in claim 49, wherein the at least one material includes isotopes of Hg-199 and wherein concentration of Hg-199 in the first semiconductor active region is sufficient to absorb neutrons and spontaneously emit gamma rays and concentration of Hg-199 in the second semiconductor active region is reduced such that it is less sensitive to neutron absorptions and corresponding ionizing radiation than the first semiconductor active region.

58. The array as claimed in claim 49, wherein the at least one material includes isotopes of B-10 and wherein concentration of B-10 in the first semiconductor active region is sufficient to absorb neutrons and spontaneously emit charged particle and gamma radiation emissions and concentration of B-10 in the second semiconductor active region is reduced such that it is less sensitive to neutron absorptions and corresponding ionizing radiation than the first semiconductor active region.

59. The array as claimed in claim 49, wherein the at least one material includes isotopes of Li-6 and wherein concentration of Li-6 in the first semiconductor active region is sufficient to absorb neutrons and spontaneously emit charged particle radiation emissions and concentration of Li-6 in the second semiconductor active region is reduced such that it is less sensitive to neutron absorptions and corresponding ionizing radiation than the first semiconductor active region.

60. The array as claimed in claim 49, wherein the at least one material includes isotopes of Gd-157 or Gd-155 and wherein concentration of Gd-157 or Gd-155 in the first semiconductor active region is sufficient to absorb neutrons and spontaneously emit charged particle and gamma radiation emissions and concentration of Gd-157 or Gd-155 in the second semiconductor active region is reduced such that it is less sensitive to the neutron absorptions and corresponding ionizing radiation than the first semiconductor active region.

61. The array as claimed in claim 49, wherein each of the semiconductor active regions comprises a detector capable of detecting charged particles.

62. The array as claimed in claim 49, wherein the neutron-induced ionizing radiation includes gamma ray emissions.

63. The array as claimed in claim 49, wherein the neutron-induced ionizing radiation includes charged particles.

64. The array as claimed in claim 49, wherein the at least one material is B-based, Li-based or Gd-based.

65. An imaging system for imaging neutron emissions and ionizing radiation, the system comprising:
    an array of solid state detectors, each of the detectors including:
        a first semiconductor active region comprising at least one material having a first concentration sufficient for generating neutron-induced ionizing radiation in response to neutron absorptions and for generating a first electronic signal in response to the neutron absorptions and corresponding ionizing radiation;
        a second semiconductor active region comprising the at least one material having a second concentration lower than the first concentration so as to be substantially less responsive to the neutron emissions for generating a second electronic signal in response to neutron-induced radiation emissions; and
        a shield positioned to shield the neutron-induced ionizing radiation emitted from the first semiconductor active region so that the second semiconductor active region in unaffected by the ionizing radiation from the fist semiconductor active region, and the second electronic signal from the second semiconductor active region is not generated in response to the neutron-induced ionizing radiation from the first semiconductor active region; and
    an array of sheets of high-density material for separating adjacent solid state detectors.

66. The imaging system as claimed in claim 65, wherein the first and second semiconductor active regions have substantially the same size and shape.

67. The imaging system as claimed in claim 65, wherein the first and second semiconductor active regions have substantially similar sensitivity to background and surrounding ionizing radiation which primarily includes gamma rays, x-rays, and charged particles, and to radiations released by neutron interactions within the first and second semiconductor active regions.

68. The imaging system as claimed in claim 65, wherein each of the detectors is a room temperature solid state detector.

69. The imaging system as claimed in claim 65, wherein the at least one material is selected from the group consisting of CdTe, CdZnTe, CdS and $HgI_2$.

70. The imaging system as claimed in claim 65, wherein each of the semiconductor active regions comprises a gamma ray spectrometer.

71. The imaging system as claimed in claim 65, wherein the at least one material includes either Cd or Hg.

72. The imaging system as claimed in claim 65, wherein the at least one material includes isotopes of Cd-113 and wherein concentration of Cd-113 in the first semiconductor active region is sufficient to absorb neutrons and spontaneously emit gamma rays and concentration of Cd-113 in the second semiconductor active region is reduced such that it is less sensitive to neutron absorptions and corresponding ionizing radiation than the first semiconductor active region.

73. The imaging system as claimed in claim 65, wherein the at least one material includes isotopes of Hg-199 and wherein concentration of Hg-199 in the first semiconductor active region is sufficient to absorb neutrons and spontaneously emit gamma rays and concentration of Hg-199 in the second semiconductor active region is reduced such that it is less sensitive to neutron absorptions and corresponding ionizing radiation than the first semiconductor active region.

74. The imaging system as claimed in claim 65, wherein the at least one material includes isotopes of B-10 and wherein concentration of B-10 in the first semiconductor active region is sufficient to absorb neutrons and spontaneously emit charged particle and gamma radiation emissions and concentration of B-10 in the second semiconductor active region is reduced such that it is less sensitive to neutron absorptions and corresponding ionizing radiation than the first semiconductor active region.

75. The imaging system as claimed in claim 65, wherein the at least one material includes isotopes of Li-6 and wherein concentration of Li-6 in the first semiconductor active region is sufficient to absorb neutrons and spontaneously emit charged particle radiation emissions and concentration of Li-6 in the second semiconductor active region is reduced such that it is less sensitive to neutron absorptions and corresponding ionizing radiation than the first semiconductor active region.

76. The imaging system as claimed in claim 65, wherein the at least one material includes isotopes of Gd-157 or Gd-155 and wherein concentration of Gd-157 or Gd-155 in the first semiconductor active region is sufficient to absorb neutrons and spontaneously emit charged particle and gamma radiation emissions and concentration of Gd-157 or Gd-155 in the second semiconductor active region is reduced such that it is less sensitive to the neutron absorptions and corresponding ionizing radiation than the first semiconductor active region.

77. The imaging system as claimed in claim 65, wherein each of the semiconductor active regions comprises a detector capable of detecting charged particles.

78. The imaging system as claimed in claim 65, wherein the neutron-induced ionizing radiation includes gamma ray emissions.

79. The imaging system as claimed in claim 65, wherein the neutron-induced ionizing radiation includes charged particles.

80. The imaging system as claimed in claim 65, wherein the at least one material is B-based, Li-based or Gd-based.

* * * * *